United States Patent
Min et al.

(10) Patent No.: US 7,746,589 B2
(45) Date of Patent: Jun. 29, 2010

(54) BIT PATTERNED MEDIUM, READING HEAD FOR READING DATA RECORDED ON BIT PATTERNED MEDIUM, AND HARD DISK DRIVE FOR RECORDING/READING DATA ON/FROM BIT PATTERNED MEDIUM

(75) Inventors: Dong-ki Min, Seoul (KR); Seung-bum Hong, Seongnam-si (KR); Byung-kyu Lee, Seoul (KR); Jin-seung Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/055,344

(22) Filed: Mar. 26, 2008

(65) Prior Publication Data
US 2009/0067078 A1  Mar. 12, 2009

(30) Foreign Application Priority Data
Sep. 7, 2007 (KR) .................. 10-2007-0091187

(51) Int. Cl.
*G11B 5/09* (2006.01)
(52) U.S. Cl. ............... 360/48; 360/40; 360/135
(58) Field of Classification Search .......... None
See application file for complete search history.

(56) References Cited

U.S. PATENT DOCUMENTS

| | | | | |
|---|---|---|---|---|
| 6,162,532 | A * | 12/2000 | Black et al. | 428/323 |
| 6,937,421 | B2 * | 8/2005 | Rubin et al. | 360/77.01 |
| 6,977,108 | B2 * | 12/2005 | Hieda et al. | 428/64.2 |
| 2007/0258161 | A1 * | 11/2007 | Richter et al. | 360/48 |
| 2008/0002269 | A1 * | 1/2008 | Sakurai et al. | 360/48 |

* cited by examiner

*Primary Examiner*—Jason C Olson
(74) *Attorney, Agent, or Firm*—Sughrue Mion, PLLC

(57) ABSTRACT

Provided are a bit patterned medium having a super track, a reading head which reads data recorded on the bit-patterned medium, and a hard disk drive (HDD) for recording/reading data on/from the bit patterned medium. The bit patterned medium includes a substrate, and a recording layer formed with a plurality of bit cells separated from each other along a plurality of tracks forming concentric circles having different radii on the substrate, wherein each track includes a super track including a plurality of sub-tracks, and bit cells formed on one of the sub-tracks are arranged at different positions in a circumference direction of the recording layer to bit cells formed on adjacent sub-tracks. The reading head which reads data recorded on a bit patterned medium has a width in a cross-track direction sufficient for reading data of an equal number of bit cells as the plurality of sub-tracks.

22 Claims, 8 Drawing Sheets

BIT PATTERNED MEDIUM, READING HEAD FOR READING DATA RECORDED ON BIT PATTERNED MEDIUM, AND HARD DISK DRIVE FOR RECORDING/READING DATA ON/FROM BIT PATTERNED MEDIUM

CROSS-REFERENCE TO RELATED PATENT APPLICATION

This application claims priority from Korean Patent Application No. 10-2007-0091187, filed on Sep. 7, 2007, in the Korean Intellectual Property Office, the disclosure of which is incorporated herein in its entirety by reference.

BACKGROUND OF THE INVENTION

1. Field of the Invention

The present invention relates to a bit patterned medium, a reading head which reads data recorded on the bit patterned medium, and a hard disk drive (HDD) which records/reads data on/from the bit patterned medium.

2. Description of the Related Art

Since HDDs have large capacity and characteristics such as high-speed access, HDDs are widely used as data storage devices of personal computers (PCs) and various kinds of digital devices. Along with the rapid increase in the amounts of handled data due to recent technology developments, high density of HDDs is required.

HDDs generally employ a magnetic recording method for recording/reading data. A magnetic recording method is a method of recording data by magnetizing a magnetic layer of a recording medium using a magnetic field and reading data by means of a magnetic signal from magnetization of the recording medium. Magnetic recording methods can be classified into a longitudinal magnetic recording method and a perpendicular magnetic recording method. In the longitudinal magnetic recording method in which data is recorded by magnetizing a magnetic layer to be parallel to the surface of the magnetic layer, a recording density of 100 Gb/m$^2$ can be achieved, and in the perpendicular recording method in which data is recorded by magnetizing a magnetic layer to be perpendicular to the surface of the magnetic layer, a recording density of about 500 Gb/m$^2$ can be achieved, which is higher than that of the longitudinal magnetic recording method.

Recently, research into an electric field recording method of recording and reading data using an electric field instead of a magnetic field has been conducted. The electric field recording method is a method of recording data by polarizing a ferroelectric layer of a recording medium using an electric field and reading data by means of an electric signal using from polarization of the recording medium. According to the electric field recording method, a recording density of over 1 Tb/m$^2$ can be achieved.

In any recording method, an increase of recording density causes a decrease in bit size, a bit being the minimum recording unit of data, and the magnitude of a signal generated from a recording medium is weakened. In order to address this problem, research into a method of increasing recording density using a patterned medium to maintain a high Signal-to-Noise Ratio (SNR) by decreasing noise from the medium also has been conducted.

FIG. 1A illustrates a schematic structure of a bit patterned medium 10. Referring to FIG. 1A, the bit patterned medium 10 includes a substrate 20 and a recording layer 30 formed on the substrate 20. The recording layer 30 includes a pattern of a plurality of bit cells 32 forming tracks of concentric circles and being physically separated from each other. A single bit is recorded in each bit cell 32, and since noise can be reduced in accordance with a small bit size, recording density can be effectively increased. According to a decrease of the bit size, the width of a reading head decreases as well. FIG. 1B is a top view illustrating the structure of the bit cells 32 of the bit patterned medium 10 together with a reading head 40. The reading head 40 reads data from each bit cell 32 of a track to be read while relatively moving along the track. In this case, the width of the reading head 40 must be sufficiently small not to generate noise due to tracks adjacent to the track to be read, and thus, the width of the reading head 40 is an important design factor as well as the width of each bit cell 32. However, reducing the width of the reading head 40 requires a very high degree of precision in a manufacturing process and thus increases manufacturing costs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a bit patterned medium having a structure for increasing reading efficiency, a reading head which reads data recorded on the bit patterned medium, and an HDD which records bit patterned medium data on the bit patterned medium and reads bit patterned medium data from the bit patterned medium.

According to an aspect of the present invention, there is provided a bit patterned medium comprising: a substrate; and a recording layer including a plurality of bit cells separated from each other along a plurality of tracks forming concentric circles having different radii on the substrate, wherein each track includes a super track having a plurality of sub-tracks, and bit cells formed on one of the sub-tracks are arranged at different positions in a circumference direction of the recording layer to bit cells formed on adjacent sub-tracks.

If a number of the plurality of sub-tracks is N, N bit cells are arranged adjacent to each other in a radius direction of the super track to cause interference of a reproduction signal due to bit cell data of each bit cell of the N bit cells, and when the bit cell data stored in the N bit cells is simultaneously read, an interval X between every two adjacent bit cells of the N bit cells in the circumference direction is determined so that $2^N$ reproduction signals generated from combinations of the data stored in the N bit cells have different values.

The interval X may be determined so that the $2^N$ reproduction signals have an equal interval value.

A circumference-directional position of the center of each bit cell of the N bit cells formed on one of the plurality of sub-tracks may be different from the circumference-directional position of the center of each bit cell of the N bit cells formed on another sub-track.

An interval between every two adjacent bit cells of the N bit cells in the circumference direction may be equal in each sub-track.

A circumference-directional length of each bit cell of the N bit cells may be equal in each sub-track.

If the number of the plurality of sub-tracks is N and the circumference-directional length is $\Delta\phi$, a circumference-directional interval between adjacent bit cells of the N bit cells in the radius direction may be formed as $\Delta\phi/N$.

The recording layer may include a magnetic material or a ferroelectric material.

According to another aspect of the present invention, there is provided a reading head for reading data recorded on a bit patterned medium, the reading head having a width in a cross-track direction sufficient for reading data of an equal number of bit cells as the number of the plurality of sub-tracks.

The width of the reading head in the cross-track direction may be equal to or less than the width of the super track.

According to another aspect of the present invention, there is provided an HDD comprising: a bit patterned medium; a head unit including a writing head which records, on a super track basis, super track data on the super track of the bit patterned medium and a reading head which reads, on a super track basis, the super track data recorded on the super track of the bit patterned medium; a head driver which drives the head unit; and a reading channel circuit which separately extracts sub-track data of each of the plurality of sub-tracks from a reproduction signal with super track data of the super track read by the reading head.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Figure 1A:
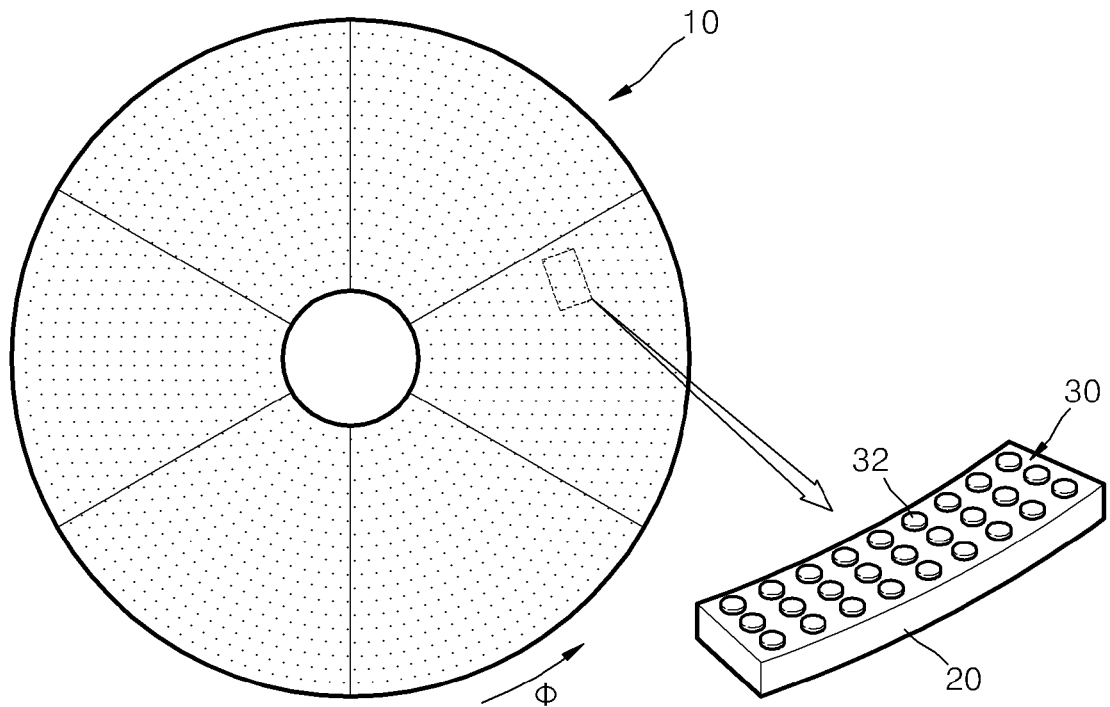
FIG. 1A illustrates a schematic structure of a bit patterned medium.
Figure 1B:
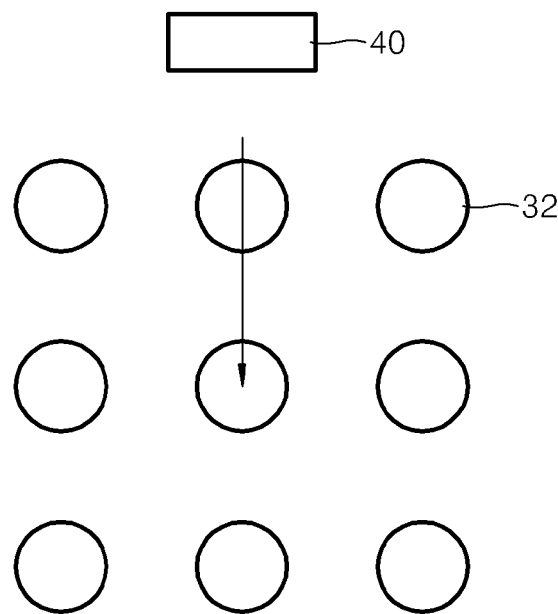
FIG. 1B is a top view illustrating the structure of bit cells of the bit patterned medium of FIG. 1A together with a reading head.

The present invention will be described in detail by explaining exemplary embodiments of the invention with reference to the attached drawings. In the drawings, like reference numbers are used to refer to like elements, and the thicknesses of layers and regions are exaggerated for clarity.

Figure 2A:
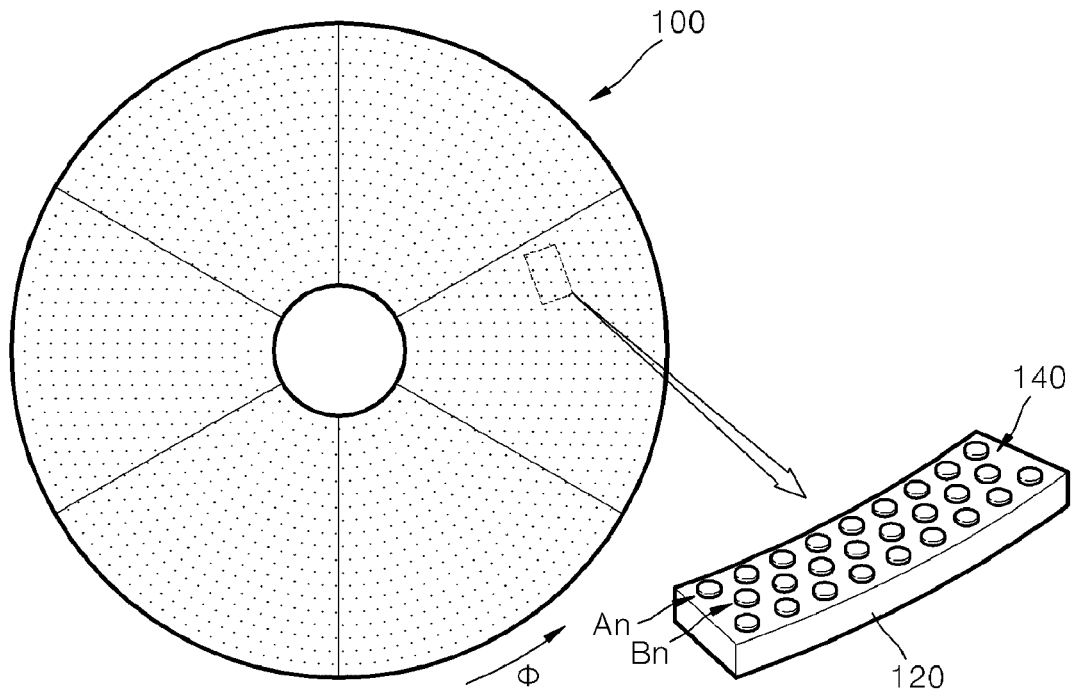
FIG. 2A illustrates a schematic structure of a bit patterned medium according to an exemplary embodiment of the present invention.
Figure 2B:
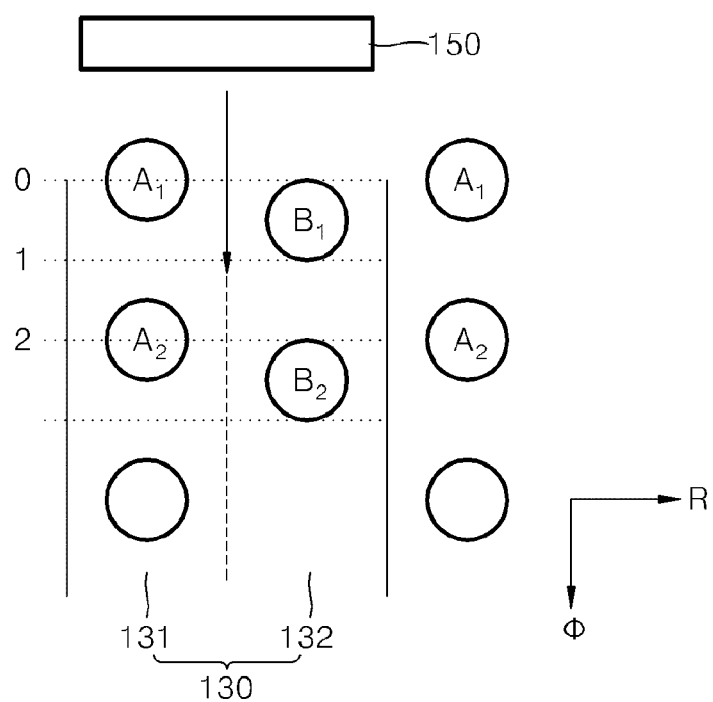
FIG. 2B is a top view illustrating the structure of bit cells and a reading head for reading data stored in the bit cells, according to an exemplary embodiment of the present invention.

FIG. 2A illustrates a schematic structure of a bit patterned medium 100 according to an exemplary embodiment of the present invention. FIG. 2B is a top view illustrating the structure of the bit patterned medium 100 and a reading head 150, according to an exemplary embodiment of the present invention. Referring to FIGS. 2A and 2B, the bit patterned medium 100 according to the current exemplary embodiment of the present invention includes a substrate 120 and a recording layer 140 formed on the substrate 120. The substrate 120 may be formed of a material such as Si or glass. The recording layer 140 can be formed of a magnetic or ferroelectric material. For example, the recording layer 140 may include a magnetic thin film structure or a magnetic multilayer thin film structure including one of Co, Fe, Pt, and Pd having excellent magnetic anisotropy characteristics and used as a recording medium for recording data thereon by magnetic recording method. Alternatively, the recording layer 140 may be formed of a ferroelectric material, such as $PZT(PbZr_xTi_{1-x}O_3)$, $PbTiO_3$, $PbZrO_3$, $SrBi_2Ta_2O_9(SBT)$, $KNbO_3$, $LiTaO_3$, or $LiNbO_3$, and used as a recording medium for recording data thereon by electric field recording method. A protection film (not shown) for protecting the recording layer 140 from the outside can be included on the recording layer 140, and a lubricant film (not shown) can be further included in order to reduce the wear of the protection film. The recording layer 140 includes a plurality of bit cells $A_n$ and $B_n$ formed in a pattern of concentric circles on the substrate 120 and separated from each other. The bit patterned medium 100 is assembled with a spindle motor (not shown) in order to record and reproduce data and rotates in a $\phi$ direction. Thus, a plurality of tracks forming concentric circles having different radii R are formed on the bit patterned medium 100, and the bit cells $A_n$ and $B_n$ are formed along the tracks. In the current exemplary embodiment, each track includes a super track 130 including a first sub-track 131 including the bit cells $A_n$ and a second sub-track 132 including the bit cells $B_n$. The bit cells $A_n$ formed on the first sub-track 131 are arranged differently from the bit cells $B_n$ formed on the second sub-track 132. That is, a coordinate value on a circumference direction axis ($\phi$ axis) of the center of each of the bit cells $A_n$ formed on the first sub-track 131 is different from a coordinate value on the $\phi$ axis of the center of each of the bit cells $B_n$ formed on the second sub-track 132. In detail, positions of the bit cells $A_n$ and $B_n$ on each track can be represented by coordinates on the $\phi$ axis, and a $\phi$ axis coordinate value of the center of each bit cell $B_n$ on the second sub-track 132 is different from a $\phi$ axis coordinate value of the center of each bit cell $A_n$ on the first sub-track 131. For example, while the $\phi$ axis coordinate value of the center of each bit cell $A_n$ on the first sub-track 131 may be 0, 2, 4, . . . , the $\phi$ axis coordinate value of the center of each bit cell $B_n$ on the second sub-track 132 may be 0.5, 2.5, 4.5, . . . , wherein the $\phi$ axis coordinate value is used for only relative position comparison as an arbitrary unit. Each of a length on the φ axis of each of the bit cells $A_n$ on the first sub-track 131 and a length on the φ axis of each of the bit cells $B_n$ on the second sub-track 132 may be 1. Each of an interval between the centers of every two bit cells $A_n$ adjacent in the φ axis direction on the first sub-track 131 and an interval between the centers of every two bit cells $B_n$ adjacent in the φ axis direction on the second sub-track 132 may be 2. A φ axis interval between bit cells $A_1$ and $B_1$ adjacent in a radius direction, i.e. an R axis direction, may be 0.5. This rule can be schematized such that when the number of sub-tracks 131 and 132 forming the super track 130 is N and the lengths of the bit cells $A_n$ and $B_n$ of the sub-tracks 131 and 132 are Δφ, a circumference-directional interval between the bit cells $A_1$ and $B_1$ adjacent in the radius direction is Δφ/N and an interval between the centers of every two bit cells $A_n$ in the circumference direction on the first sub-track 131 and an interval between the centers of every two bit cells $B_n$ in the circumference direction on the second sub-track 132 are 2 Δφ. However, this regular configuration is relatively advantageous in terms of separation of data on the sub-tracks 131 and 132 but not limited thereto. For example, an interval between bit cells $A_1$ and $A_2$ or $B_1$ and $B_2$ adjacent in the circumference direction may be greater than 2 Δφ.

This arrangement is an example of the rule that reproduction signals obtained from data stored in the bit cells $A_n$ and $B_n$ belonging to different sub-tracks and adjacent in the radius direction interfere with each other and reproduction signals from a various combination of data stored in each of the bit cells $A_n$ and $B_n$ have different values for discrimination. A process of deriving this arrangement will be described later with reference to FIGS. 3A through to 7.

The reading head 150 reads data recorded on the bit patterned medium 100 while relatively moving in a state of maintaining a predetermined distance apart from the bit patterned medium 100 above the bit patterned medium 100. In the current exemplary embodiment, the reading head 150 has a characteristic in a width of a cross track direction, and FIG. 2B is a top view illustrating only a cross section of the reading head 150 facing the bit patterned medium 100 in order to compare the width of the reading head 150 and a track width of the bit patterned medium 100. The width of the reading head 150 in the cross track direction is formed as a size of reading data of bit cells corresponding to the number of a plurality of sub-tracks at one time. Here, the cross track direction is a direction crossing tracks, i.e. the radius (R) direction, and the width of the reading head 150 is equal to a width obtained by adding the width of the first sub-track 131 and the width of the second sub-track 132, i.e. the width of the super track 130. However, this is only an example, and since the width of the bit cells $A_n$ and $B_n$ is less than the combined width of the first and second sub-tracks 131 and 132, the width of the reading head 150 can be less than the width of the super track 130 only if the reading head 150 can read data recorded in the bit cell $A_n$ of the first sub-track 131 and data recorded in the bit cell $B_n$ of the second sub-track 132 at one time. The reading head 150 can have a structure of reading data using a magnetic recording/reproducing method or electric field recording/reproducing method. For example, a MR, GMR, or TMR device for reading data recorded on a recording medium using a feature that electrical resistance varies due to a magnetic field signal generated from magnetization of a recording layer can be employed in the reading head 150. A semiconductor device for reading data recorded on a recording medium using a feature that electrical resistance varies due to an electric field signal generated from polarization of a recording layer also can be employed in the reading head 150.

Figure 3A:
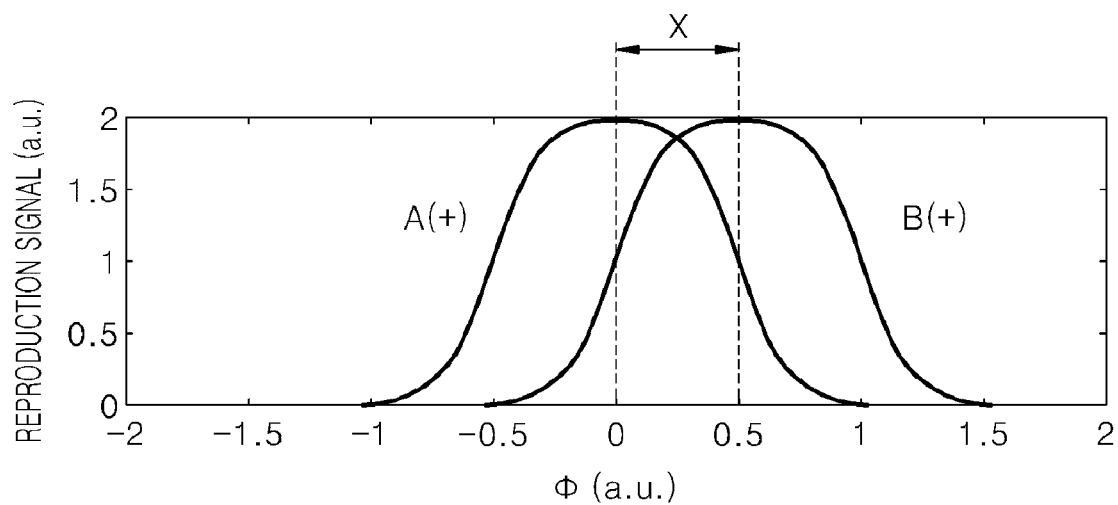
FIGS. 3A and 3B are graphs respectively showing reproduction signals of two adjacent bit cells and a reproduction signal obtained by adding the two reproduction signals when two positive data values are respectively recorded in the two adjacent bit cells, according to an exemplary embodiment of the present invention.
Figure 3B:
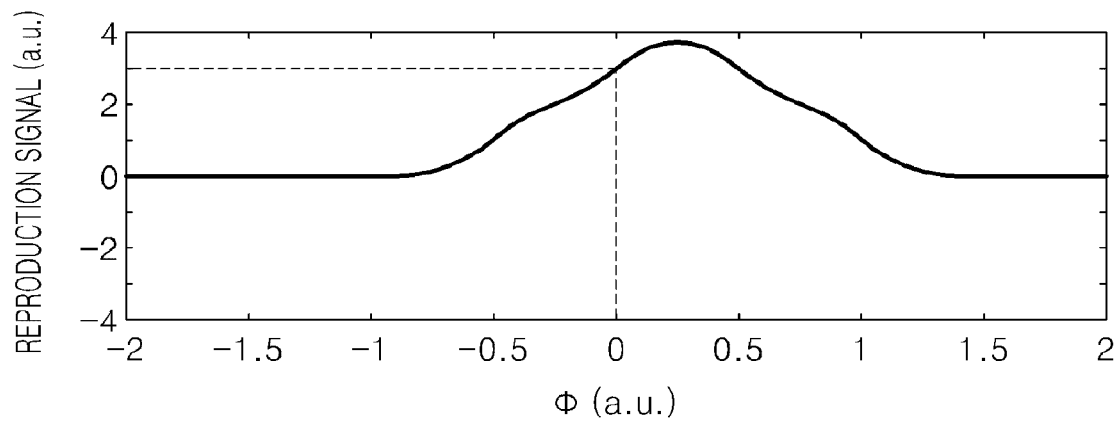
Figure 4A:
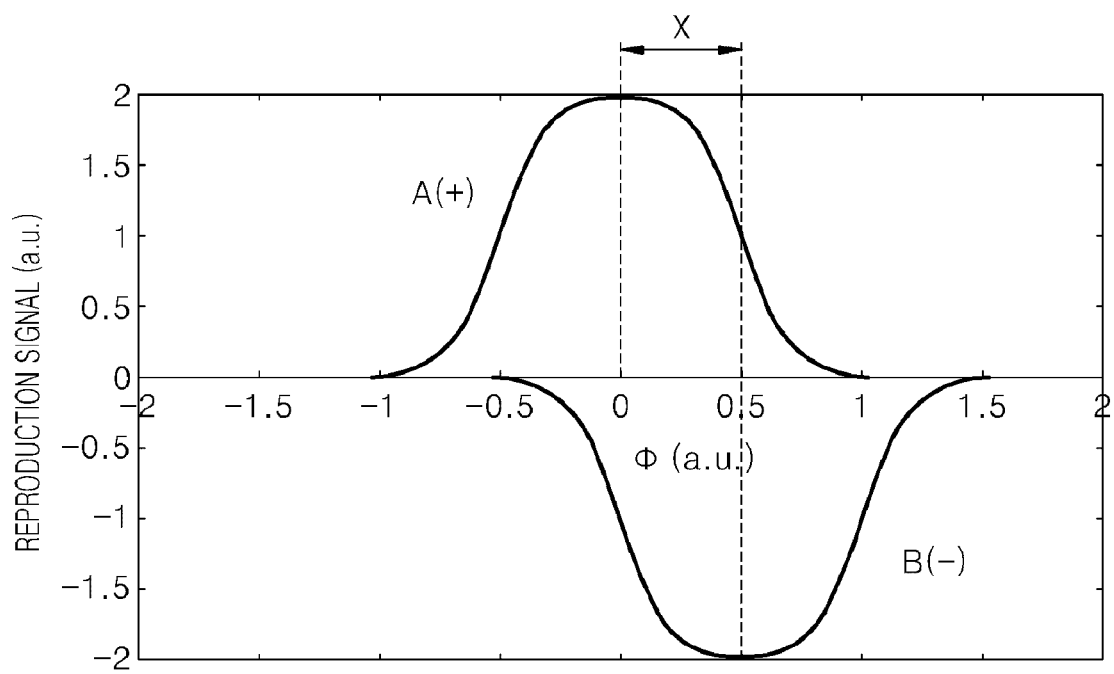
FIGS. 4A and 4B are graphs respectively showing reproduction signals of two adjacent bit cells and a reproduction signal obtained by adding the two reproduction signals when positive and negative data values are respectively recorded in the two adjacent bit cells, according to an exemplary embodiment of the present invention.
Figure 4B:
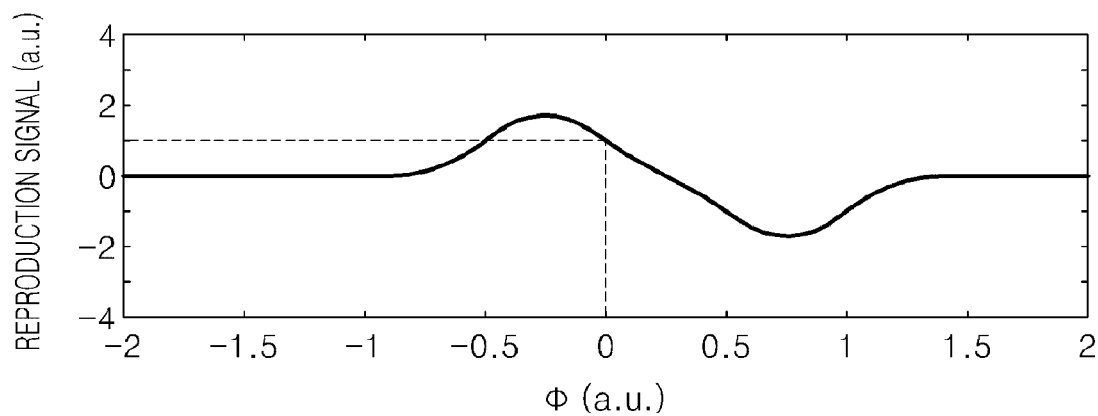
Figure 5A:
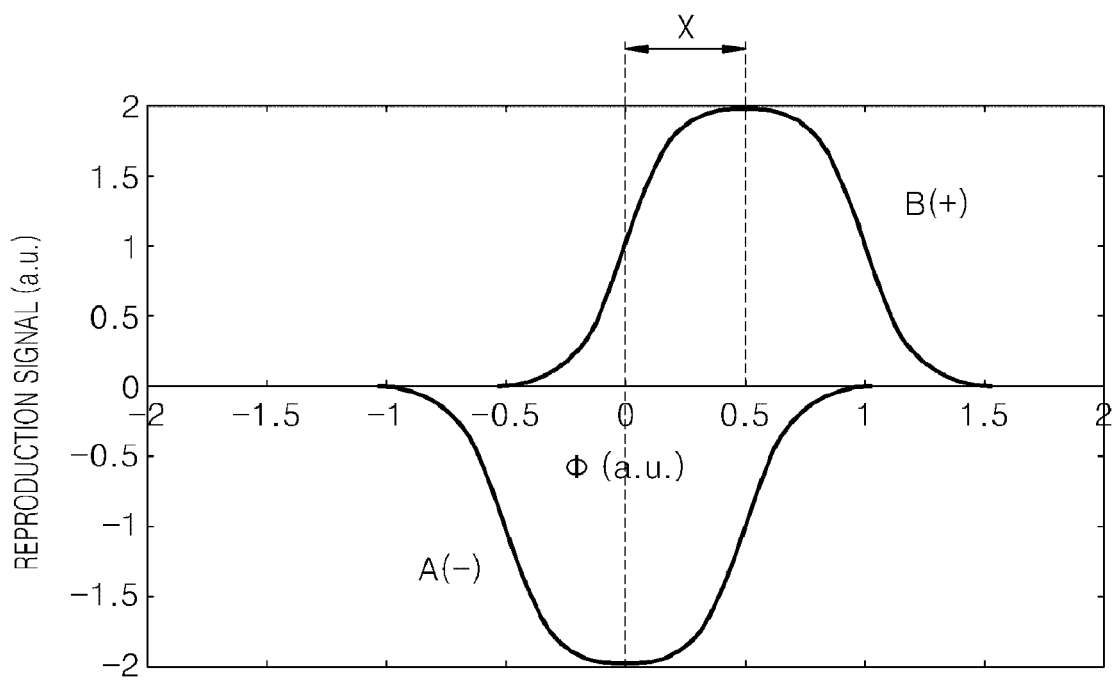
FIGS. 5A and 5B are graphs respectively showing reproduction signals of two adjacent bit cells and a reproduction signal obtained by adding the two reproduction signals when negative and positive data values are respectively recorded in the two adjacent bit cells, according to an exemplary embodiment of the present invention.
Figure 5B:
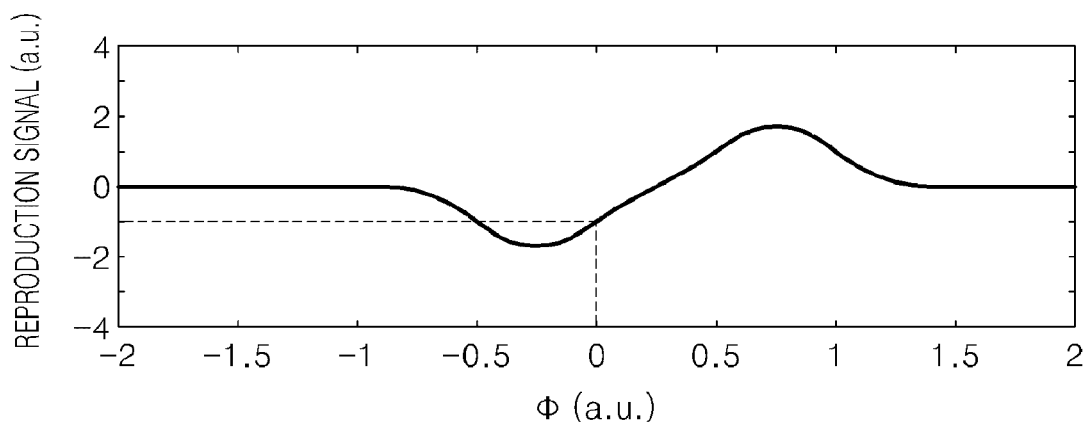
Figure 6A:
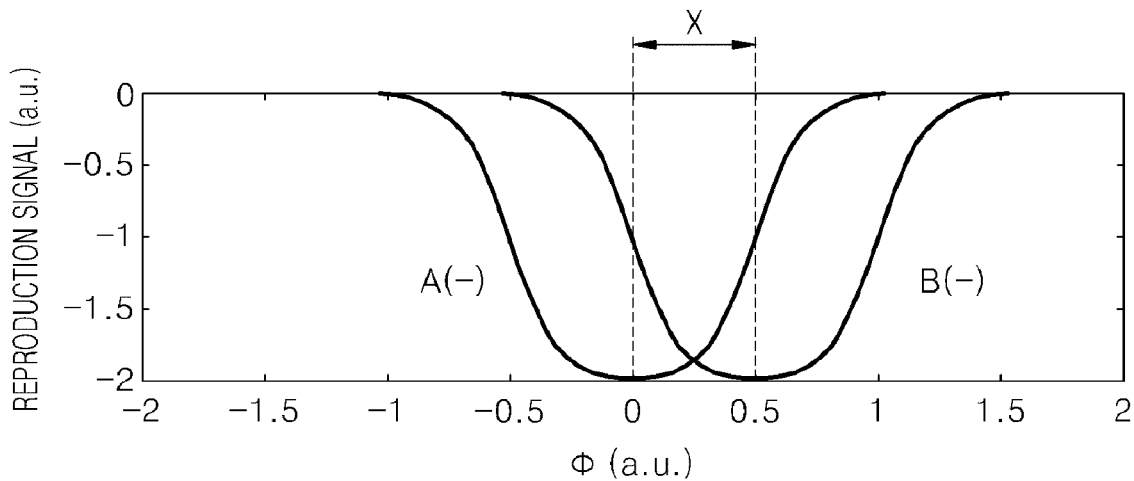
FIGS. 6A and 6B are graphs respectively showing reproduction signals of two adjacent bit cells and a reproduction signal obtained by adding the two reproduction signals when two negative data values are respectively recorded in the two adjacent bit cells, according to an exemplary embodiment of the present invention.
Figure 6B:
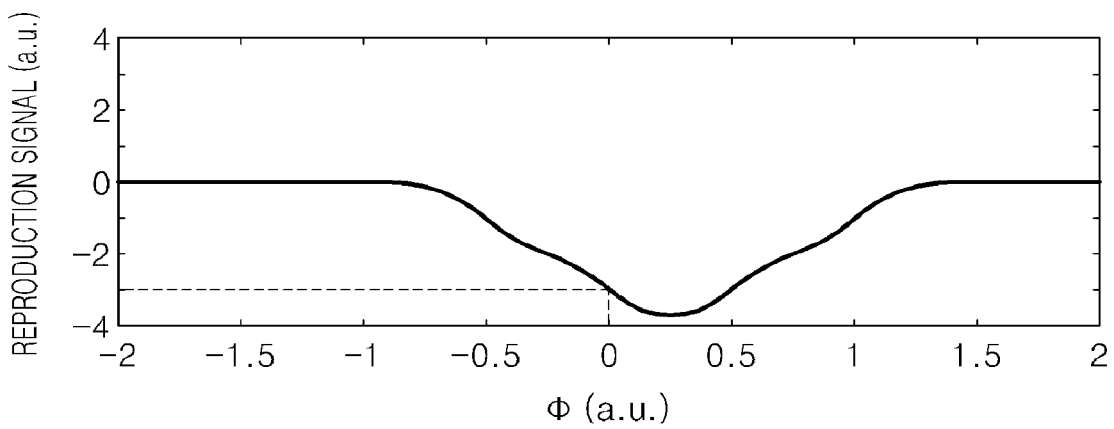
Figure 7:
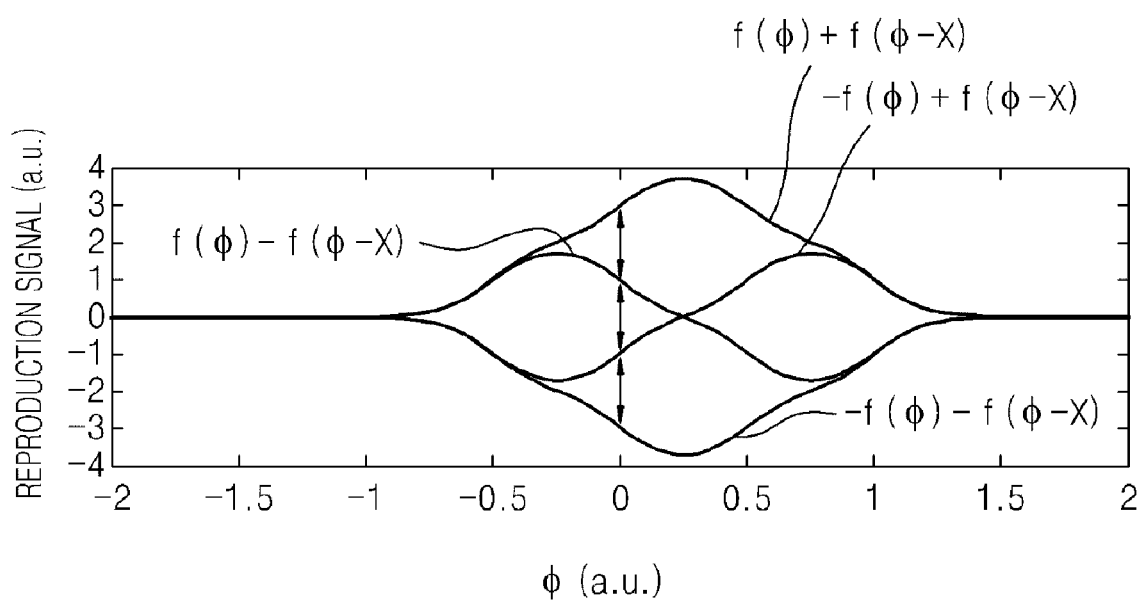
FIG. 7 is a graph showing a plurality of reproduction signals obtained from combinations of data of bit cells in order to describe a method of setting an interval between every two adjacent bit cells according to an exemplary embodiment of the present invention.

As described above, if tracks of the bit patterned medium 100 are configured to include the super track 130 including the first sub-track 131 and the second sub-track 132, even if the width of the reading head 150 is formed to correspond to the width of the super track 130 corresponding to the combined width of the first and second sub-tracks 131 and 132, data recorded in the bit cell $A_n$ or $B_n$ of each sub-track can be reproduced. This will be described with reference to FIGS. 3A through to 7. FIG. 3A shows graphs which show reproduction signals only from the bit cells $A_1$ or B1, respectively. That is, reproduction signals A(+) and B(+) are reproduction signals under the assumption that the width of the reading head 150 is equal to the width of the first and second sub-tracks 131 and 132. FIG. 3B shows a reproduction signal of a reading head 150 according to an exemplary embodiment of the present invention. Referring to FIG. 3B, the reproduction signal generated by the reading head 150 according to an exemplary embodiment of the present invention, i.e. the reading head 150 having the width corresponding to the super track 130, can be obtained by adding the two reproduction signals illustrated in FIG. 3A. If the reproduction signal A(+) is indicated by f(φ), the reproduction signal B(+) can be indicated by f(φ–X), and thus, the reproduction signal illustrated in FIG. 3B can be indicated by f(φ)+f(φ–X). Likewise, FIG. 4A shows two reproduction signals of the bit cells $A_1$ and $B_1$ and FIG. 4B shows a reproduction signal obtained by adding the two reproduction signals when positive and negative data values are respectively recorded in the bit cell $A_1$ of the first sub-track 131 and the bit cell $B_1$ of the second sub-track 132, according to an exemplary embodiment of the present invention, and the reproduction signal illustrated in FIG. 4B is indicated by f(φ)–f(φ–X). FIGS. 5A and 5B are graphs respectively showing reproduction signals of the bit cells $A_1$ and $B_1$ and a reproduction signal obtained by adding the two reproduction signals when negative and positive data values are respectively recorded in the bit cell $A_1$ of the first sub-track 131 and the bit cell $B_1$ of the second sub-track 132, according to an exemplary embodiment of the present invention, and the reproduction signal illustrated in FIG. 5B is indicated by –f(φ)+f(φ–X). FIGS. 6A and 6B are graphs respectively showing reproduction signals of the bit cells $A_1$ and $B_1$ and a reproduction signal obtained by adding the two reproduction signals when two negative data-values are respectively recorded in the bit cell $A_1$ of the first sub-track 131 and the bit cell $B_1$ of the second sub-track 132, according to an exemplary embodiment of the present invention, and the reproduction signal illustrated in FIG. 6B is indicated by –f(φ)–f(φ–X). Referring to the graphs the reading head 150 shows different reproduction signal patterns for distinguishing various sets of data values recorded in the bit cells $A_1$ and $B_1$ from each other. In detail, referring to FIGS. 3B, 4B, 5B, and 6B, reproduction signal values of the four cases at a point where a φ axis coordinate value is 0 are different, that is, 3, 1, –1, and –3, respectively. That is, a detection position $φ_p$ (0 in the graphs) and a circumference directional interval X between the bit cells $A_1$ and $B_1$ belonging to different sub-tracks and adjacent in the radius direction are determined so that reproduction signal values obtained from four sets of data value of the bit cells $A_1$ and $B_1$ have different values for discrimination, and in particular, determined so that the four reproduction signals have the same interval value for easy data separation. That is, referring to FIG. 7 which shows the four graphs of FIGS. 3B, 4B, 5B, and 6B all together, the conditions described above can be represented by Equation 1.

$$\{f(φ_p)+f(φ_p-X)\}-\{f(φ_p)-f(φ_p-X)\}=\{f(φ_p)-f(φ_p-X)\}-\{-f(φ_p)+f(φ_p-X)\}\{f(φ_p)-f(φ_p-X)\}-\{-f(φ_p)+f(φ_p-X)\}=\{-f(φ_p)+f(φ_p-X)\}-\{-f(φ_p)-f(φ_p-X)\}$$ (Equation 1)

If Equation 1 is simplified, Equation 2 can be obtained.

$$f(\phi_p) = 2f(\phi_p - X) \quad \text{(Equation 2)}$$

Equations 1 and 2 are for a case where N=2, and the same principle is applied to an arbitrary natural number N. That is, when the number of sub-tracks is N and a width of a reading head is formed as a size for reading data of N bit cells at one time, a circumference directional interval X between bit cells adjacent in a radius direction and a sampling position $\phi_p$ can be determined so that $2^N$ reproduction signal values obtained from sets of data of N bit cells have different values, and may be determined so that the reproduction signals have the same interval value.

As described above, the reproduction signals according to the sets of the data of the bit cells $A_1$ and $B_1$ are detected discriminatively, and thus, the data recorded in the bit cell $A_1$ of the first sub-track 131 and the data recorded in the bit cell $B_1$ of the second sub-track 132 can be read separately. In addition, since data of two bit cells is read at one time, a reproducing rate is twice that of a conventional reading head in a state of the same recording density.

Figure 8:
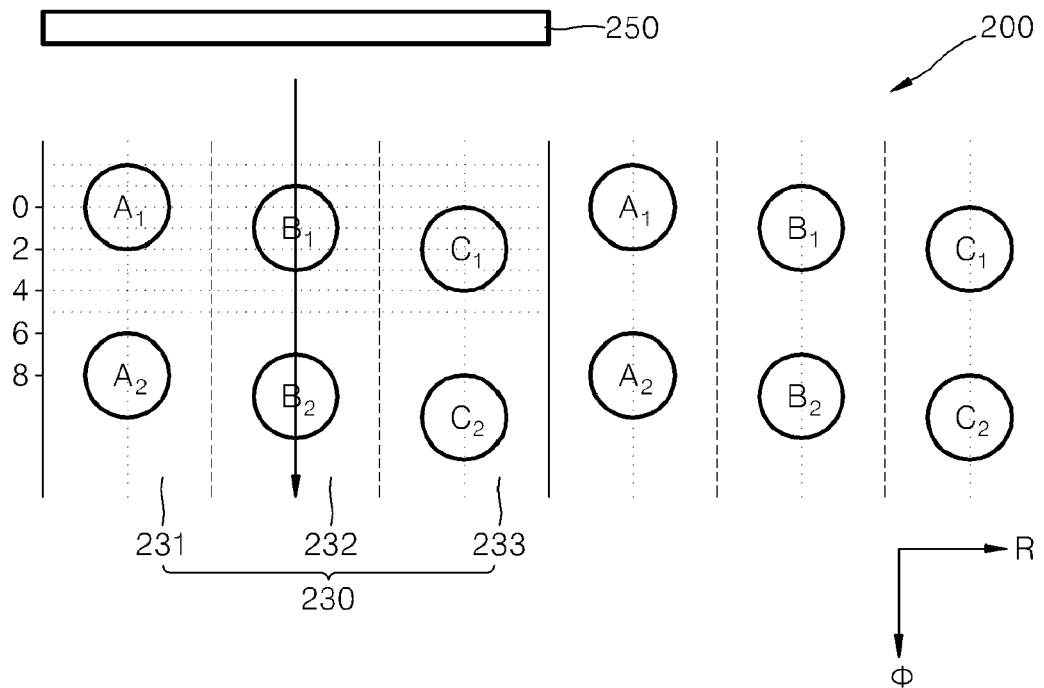
FIG. 8 illustrates a schematic structure of a bit patterned medium and a reading head according to another exemplary embodiment of the present invention.

FIG. 8 is a top view of a bit patterned medium 200 and a reading head 250 according to another exemplary embodiment of the present invention. Referring to FIG. 8, the bit-patterned medium 200 includes a super track 230 including a first sub-track 231, a second sub-track 232, and a third sub-track 233. An interval between the centers of every two bit cells $A_n$ adjacent in a circumference direction ($\phi$ axis direction) on the first sub-track 231, an interval between the centers of every two bit cells $B_n$ adjacent in the $\phi$ axis direction on the second sub-track 232 and an interval between the centers of every two bit cells $C_n$ adjacent in the $\phi$ axis direction on the second sub-track 233 are 8. In addition, a circumference directional length of each of the bit cells $A_n$, $B_n$, and $C_n$ is 4. A circumference directional interval between every two bit cells (e.g., $A_1$ and $B_1$ or $B_1$ and $C_1$) adjacent in the radius direction is 1. However, this arrangement is only an example and the arrangement is satisfied only if conditions for separating data of the bit cells $A_n$, $B_n$, and $C_n$ belonging to the first, second, and third sub-tracks 231, 232, and 233 are satisfied, i.e. if reproduction signals obtained from data stored in the bit cells $A_n$, $B_n$, and $C_n$ interfere with each other and reproduction signals from various combinations of data stored in each of the bit cells $A_n$, $B_n$, and $C_n$ have different values for discrimination. In addition, the bit cells $A_n$, $B_n$, and $C_n$ may be arranged so that interference between signals due to a bit cell $A_{n+1}$ and a bit cell $B_n$ does not occur or is minimized.

The width of the reading head 250 corresponds to the combined width of the first, second, and third sub-tracks 231, 232, and 233. However, the present invention is not limited thereto, and the width of the reading head 250 can be smaller only if the reading head 250 can read data recorded on the bit cell $A_1$ on the first sub-track 231, the bit cell $B_1$ on the second sub-track 232, and the bit cell $C_1$ on the third sub-track 233 at one time. Since such a reading head 250 reads three pieces of data of three bit cells at one time, a reproducing rate is three times that of a conventional reading head in a state of the same recording density.

In the above description, although the bit patterned medium 100 or 200 has been described as a case where the super track 130 or 230 includes first and second sub-tracks 131 and 132 or first, second, and third sub-tracks 231, 232, and 233, the number of sub-tracks can be increased. However, as the number of sub-tracks increases, a reproducing rate increases but a process of separating data of each sub-track from data read from a super track by a reading head may be complicated, and thus, an appropriate number of sub-tracks may be formed in view of the above.

Figure 9:
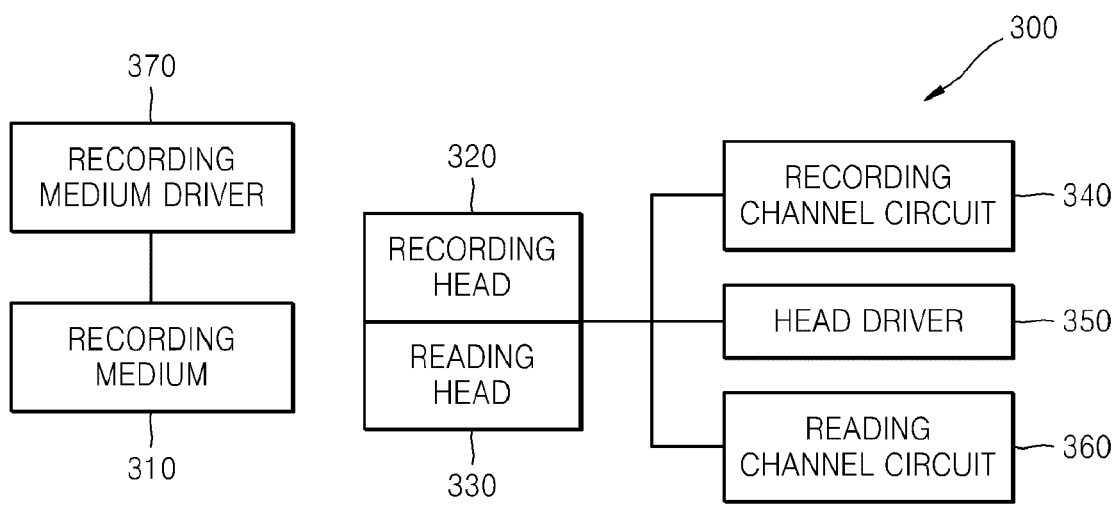
FIG. 9 is a schematic block diagram of an HDD according to an exemplary embodiment of the present invention.

FIG. 9 is a schematic block diagram of an HDD 300 according to an exemplary embodiment of the present invention. Referring to FIG. 9, the HDD 300 according to the current exemplary embodiment of the present invention includes a recording medium 310, a recording medium driver 370 driving the recording medium 310, a head unit including a recording head 320 recording data on the recording medium 310 and a reading head 330 reading data stored in the recording medium 310, a head driver 350 driving the head unit to a predetermined position above the recording medium 310, a recording channel circuit 340 encoding data to be recorded on the recording head 320, and a reading channel circuit 360 decoding data read by the reading head 330.

The recording medium 310 is a bit patterned medium having a plurality of super tracks and may be the bit patterned medium 100 or 200 illustrated in FIGS. 2A through 8, and the number of sub-tracks can be 2, 3, or a natural number N. This is not described again. The recording medium driver 370 can employ, for example, a spindle motor. The head unit can be configured according to the magnetic recording/reproducing method or electric field recording/reproducing method. In any case, the width of the cross section of the reading head 330 facing the recording medium 310 corresponds to the width of a super track. The head driver 350 drives the head unit to a predetermined position above the recording medium 310 when recording or reproduction is performed, and can employ, for example, a voice coil motor (VCM). In particular, when reproduction is performed, the head driver 350 drives the head unit so that the reading head 330 relatively moves along the centerline of the super track of the recording medium 310. The recording channel circuit 340 encodes data to be recorded when recording is performed, and the reading channel circuit 360 separates data of each sub-track from data read from the super track by the reading head 330 and decodes the separated data when reproduction is performed. If the data read on a super track basis is data of N bit cells, the reading channel circuit 360 separates data of each bit cell from a reproduction signal at a sampling position at which $2^N$ reproduction signals obtained from a various combination of data stored in the N bit cells have the same interval value. In addition, if plurality of sampling positions exist, it can be configured to separate data of each bit cell based on values obtained by appropriately operating reproduction signals at the plurality of sampling positions.

As described above, a bit patterned medium, according to the exemplary embodiments of the present invention, has a structure in which a super track includes a plurality of sub-tracks and bit cells of each sub-track are arranged differently, and a reading head, according to the exemplary embodiments of the present invention, has a structure in which the width of the reading is sufficient to read data of the plurality of sub-tracks at one time. All other descriptions related to the present invention are for illustrative purposes; for example, a recording/reproducing method can be not only a magnetic recording/reproducing method or electric field recording/reproducing method but also any recording/reproducing method provided the recording/reproducing method can be applied to the bit patterned medium and the reading head according to the present invention.

The bit patterned medium, according to the exemplary embodiments of the present invention, has a structure including a super track which includes a plurality of sub-tracks and bit cells of each sub-track are arranged differently. According to this configuration, data stored in a plurality of bit cells can be read at one time and separated, and the bit patterned medium is suitable as a recording medium for implementing high-density recording.

In addition, since the reading head, according to the exemplary embodiments of the present invention, has a large width in comparison to a conventional reading head having the same recording density, a process of manufacturing the reading head is relatively easy, thereby reducing manufacturing costs, and since data is reproduced in units of super tracks each including a plurality of sub-tracks, a reproducing rate is high.

In addition, an HDD, according to the exemplary embodiments of the present invention, employs a reading head for reducing manufacturing costs under conditions of the same recording density and can reduce power consumption when the HDD is driven.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bit patterned medium comprising:
   a substrate; and
   a recording layer including a plurality of bit cells separated from each other along a plurality of tracks forming concentric circles having different radii on the substrate,
   wherein each track includes a super track having a plurality of sub-tracks, and bit cells formed on one of the sub-tracks are arranged at different positions in a circumference direction of the recording layer to bit cells formed on adjacent sub-tracks,
   wherein if a number of the plurality of sub-tracks is N,
   N bit cells are arranged adjacent to each other in a radius direction of the super track to cause interference of a reproduction signal due to bit cell data of each bit cell of the N bit cells, and
   when the bit cell data stored in the N bit cells is simultaneously read, an interval X between every two adjacent bit cells of the N bit cells in the circumference direction is determined so that at a predetermined position corresponding to one bit cell of the N bit cells, $2^N$ reproduction signal values from respective combinations of the bit cell data stored in the N bit cells are all different.

2. The bit patterned medium of claim 1, wherein the interval X is determined so that the $2^N$ reproduction signals have an equal interval value.

3. The bit patterned medium of claim 2, wherein when N is 2, the interval X satisfies an equation $f(\phi) = 2f(\phi - X)$, where $f(\phi)$ is a reproduction signal generated from the bit cell data stored in a bit cell of the N bit cells, as a function of a coordinate value $\phi$ indicating a position in the circumference direction.

4. The bit patterned medium of claim 1, wherein an interval between every two adjacent bit cells in the circumference direction is equal in each sub-track.

5. The bit patterned medium of claim 4, wherein a circumference-directional length of each bit cell is equal in each sub-track.

6. The bit patterned medium of claim 5, wherein if a number of the plurality of sub-tracks is N and the circumference-directional length is $\Delta\phi$,
   a circumference-directional interval between adjacent bit cells in a radius direction is formed as $\Delta\phi/N$.

7. The bit patterned medium of claim 6, wherein the circumference-directional interval between bit cells adjacent in the circumference direction is equal to or greater than $2\Delta\phi$.

8. The bit patterned medium of claim 1, wherein the recording layer includes a magnetic material.

9. The bit patterned medium of claim 8, wherein the recording layer further includes a material comprising at least one of Co, Fe, Pt and Pd.

10. The bit patterned medium of claim 1, wherein the recording layer includes a ferroelectric material.

11. A bit cell arrangement method of a bit patterned medium including a substrate and a recording layer having a plurality of bit cells separated from each other along a plurality of tracks forming concentric circles having different radii on the substrate, wherein each track includes a super track having a plurality of sub-tracks, and bit cells formed on one of the sub-tracks are arranged at different positions in a circumference direction of the recording layer to bit cells formed on adjacent sub-tracks, the method comprising:
   if the number of the plurality of sub-tracks is N, arranging N bit cells adjacent to each other in a radius direction in the super track to cause interference of a reproduction signal due to data of each bit cell; and
   when data stored in the N bit cells is simultaneously read, determining an interval X between every two adjacent bit cells in a circumference direction so that at a predetermined position corresponding to one bit cell of the N bit cells, $2^N$ reproduction signals from respective combinations of the data stored in the N bit cells are all different.

12. A reading head which reads bit patterned medium data recorded on the bit patterned medium of claim 1, wherein the reading head has a width in a cross-track direction sufficient for reading bit cell data of an equal number of bit cells as a number of the plurality of sub-tracks, at once.

13. The reading head of claim 12, wherein the width of the reading head in the cross-track direction is equal to or less than a width of the super track.

14. The reading head of claim 12, wherein the reading head is configured to use a magnetic field to record and reproduce the bit patterned medium data.

15. The reading head of claim 12, wherein the reading head is configured to use an electric field to record and reproduce the bit patterned medium data.

16. A hard disk drive (HDD) comprising:
   the bit patterned medium of claim 1;
   a head unit including a recording head which records, on a super track basis, super track data on the super track of the bit patterned medium and a reading head which reads, on a super track basis, the super track data recorded on the super track of the bit patterned medium;
   a head driver which drives the head unit; and
   a reading channel circuit which separately extracts sub-track data of each of the plurality of sub-tracks from a reproduction signal with the super track data of the super track read by the reading head.

17. The HDD of claim 16, wherein a width of the reading head in a cross-track direction is equal to or less than a width of the super track.

18. The HDD of claim 16, wherein the head unit is configured to use a magnetic field to record and reproduce the super track data.

19. The HDD of claim 16, wherein the head unit is configured to use an electric field to record and reproduce the super track data.

20. The HDD of claim 16, wherein the head driver drives the head unit so that the reading head reads the super track data along a centerline of the super track.

21. The HDD of claim 16, wherein if the super track data read from the super track includes bit cell data of N bit cells, the reading channel circuit separates the bit cell data of each bit cell of the of N bit cells from a reproducing signal at a sampling position at which $2^N$ reproduction signals from combinations of the bit cell data stored in the N bit cells have an equal interval value.

22. The HDD of claim 21, wherein when a plurality of sampling positions exist, the bit cell data of each bit cell of the of N bit cells is separated from a value obtained by operating reproduction signals at the plurality of sampling positions.

\* \* \* \* \*